(12) United States Patent
Moore

(10) Patent No.: US 11,573,966 B2
(45) Date of Patent: Feb. 7, 2023

(54) METHOD AND SYSTEM FOR PERFORMING SEARCH WITH SPECIALIZED SORT

(71) Applicant: JPMorgan Chase Bank, N.A., New York, NY (US)

(72) Inventor: Devin C. Moore, Columbus, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 9 days.

(21) Appl. No.: 16/998,452

(22) Filed: Aug. 20, 2020

(65) Prior Publication Data

US 2021/0064629 A1 Mar. 4, 2021

Related U.S. Application Data

(60) Provisional application No. 62/892,194, filed on Aug. 27, 2019.

(51) Int. Cl.
*G06F 16/2457* (2019.01)
*G06F 16/903* (2019.01)
*G06F 16/9538* (2019.01)

(52) U.S. Cl.
CPC .. *G06F 16/24578* (2019.01); *G06F 16/90344* (2019.01); *G06F 16/9538* (2019.01)

(58) Field of Classification Search
CPC ......... G06F 16/24578; G06F 16/90344; G06F 16/9538; G06F 16/256
See application file for complete search history.

(56) References Cited

U.S. PATENT DOCUMENTS

| | | | | |
|---|---|---|---|---|
| 10,726,020 | B1 * | 7/2020 | Hansen | G06F 16/248 |
| 2016/0012106 | A1 * | 1/2016 | Franceschini | G06F 16/3344 707/728 |
| 2016/0294640 | A1 * | 10/2016 | Da Silva | H04L 61/2007 |
| 2020/0081992 | A1 * | 3/2020 | Lynch | G06F 9/5027 |
| 2020/0320150 | A1 * | 10/2020 | Brown | G06F 16/953 |

* cited by examiner

*Primary Examiner* — William B Partridge
*Assistant Examiner* — Aryan D Toughiry
(74) *Attorney, Agent, or Firm* — Greenblum & Bernstein, P.L.C.

(57) ABSTRACT

A method for performing an Internet search is provided. The method includes: receiving a textual input that includes at least one search term; using the at least one search term to identify a plurality of Internet-accessible information items that relate to the at least one search term; assigning a respective relevance score to each item of the identified plurality of Internet-accessible information items, such that each respective relevance score is based on a degree of closeness of a textual match between the corresponding information item and the at least one search term; and outputting an ordered list of results, the order of which is based on the relevance scores.

16 Claims, 11 Drawing Sheets

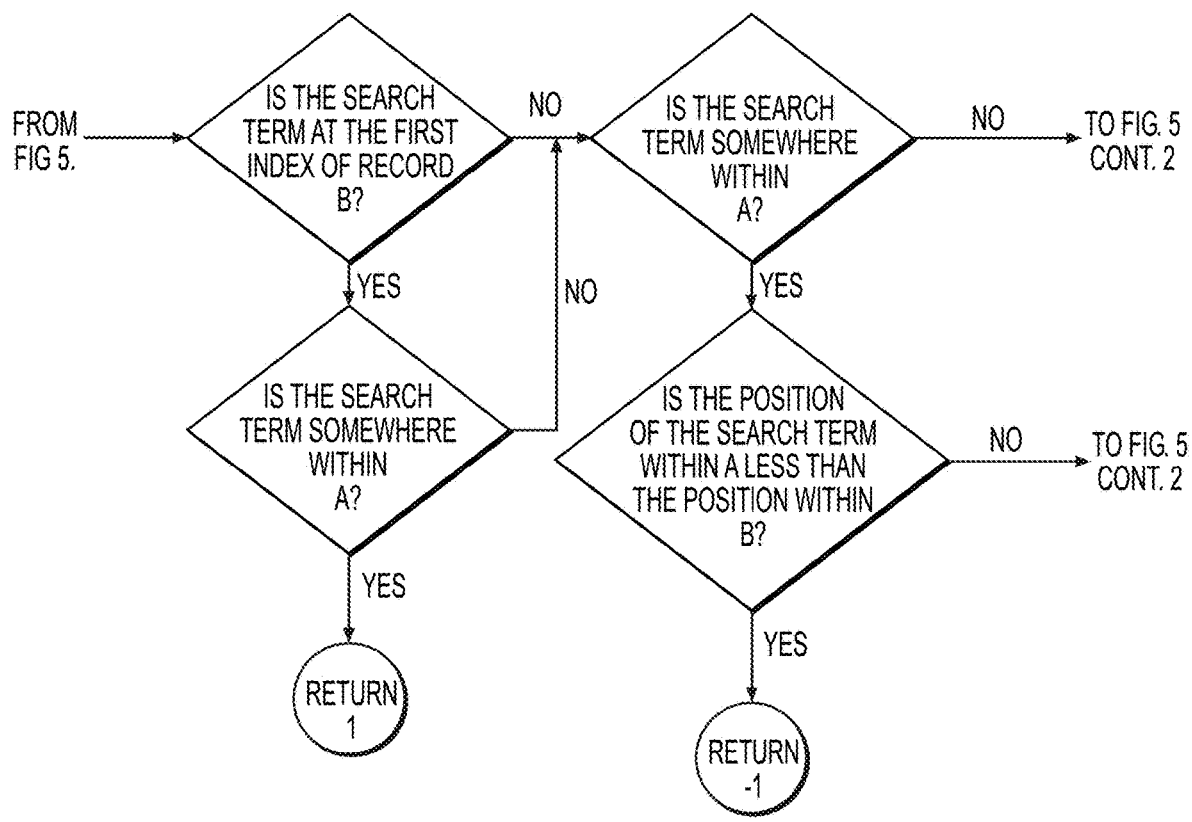
FIG. 5 CONT.1

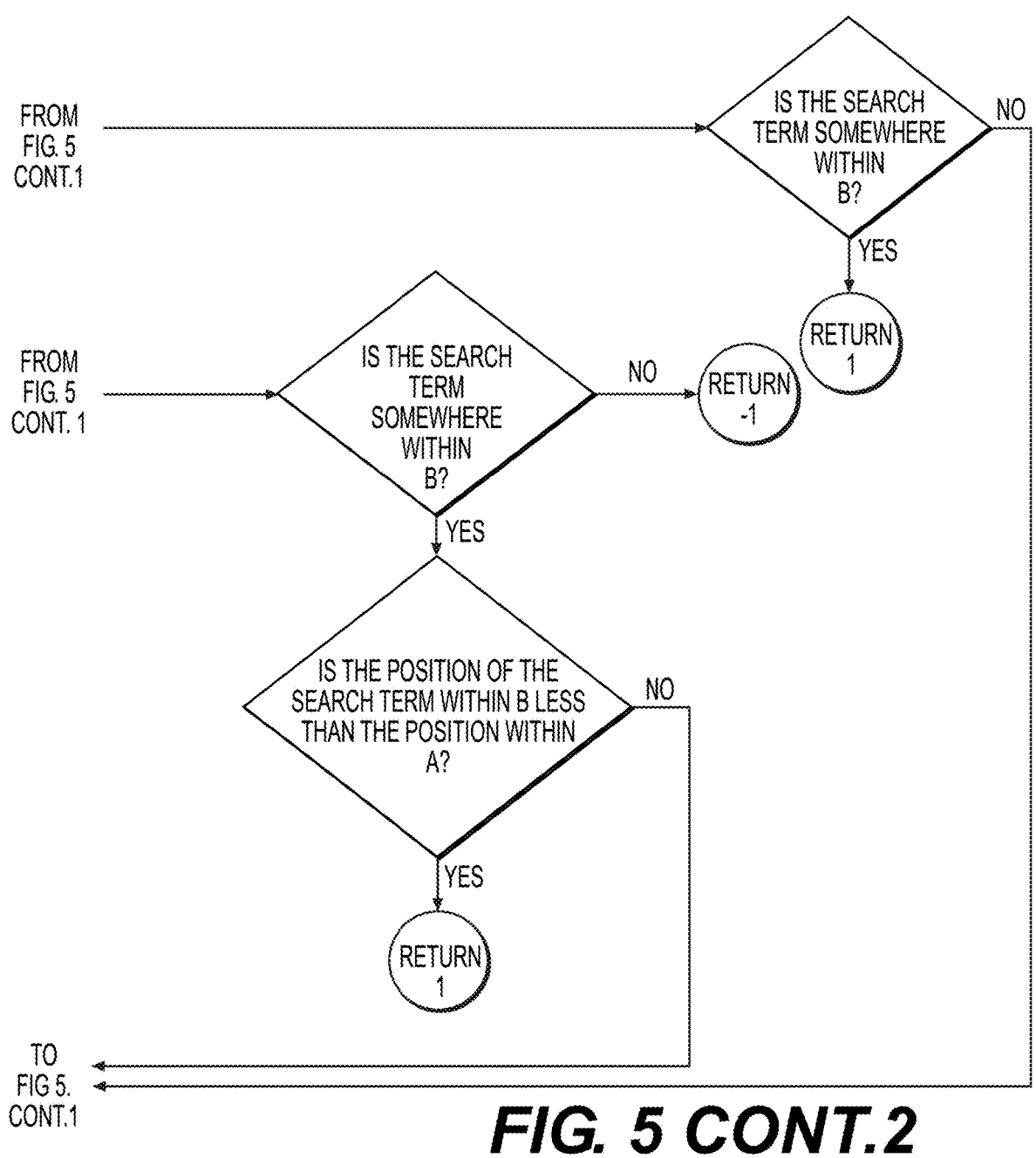
FIG. 5 CONT.2

| GET MY SOFTWARE | EXACT MATCH? ☐ | ADOBE® | ENTER |
|---|---|---|---|
| ADOBE® SYSTEMS - ADOBE® EXPERIENCE PLATFORM SDK - ADOBE® ANALYTICS EXTENSION - iOS® | | | RESEARCH: 2 |
| ADOBE® SYSTEMS - ADOBE® EXPERIENCE PLATFORM SDK - ADOBE® ANALYTICS EXTENSION - ANDROID® | | | RESEARCH: 1 |
| ADOBE® SYSTEMS - ADOBE® EXPERIENCE PLATFORM SDK - ADOBE® AUDIENCE MANAGER EXTENSION - iOS® | | | RESEARCH: 1 |
| ADOBE® SYSTEMS - ADOBE® EXPERIENCE PLATFORM SDK - ADOBE® CAMPAIGN CLASSIC EXTENSION - iOS® | | | RESEARCH: 1 |
| ADOBE® SYSTEMS - ADOBE® EXPERIENCE PLATFORM SDK - ADOBE® CAMPAIGN STANDARD EXTENSION - iOS® | | | RESEARCH: 1 |
| ADOBE® SYSTEMS - ADOBE® EXPERIENCE PLATFORM SDK - ADOBE® AUDIENCE MANAGER EXTENSION - ANDROID® | | | RESEARCH: 1 |
| ADOBE® SYSTEMS - ADOBE® EXPERIENCE PLATFORM SDK - ADOBE® CAMPAIGN CLASSIC EXTENSION - ANDROID® | | | RESEARCH: 1 |
| ADOBE® SYSTEMS - ADOBE® EXPERIENCE PLATFORM SDK - ADOBE® CAMPAIGN STANDARD EXTENSION - ANDROID® | | | RESEARCH: 1 |
| ADOBE® SYSTEMS - ADOBE® EXPERIENCE PLATFORM SDK - ADOBE® ANALYTICS MOBILE SERVICES EXTENSION - iOS® | | | RESEARCH: 1 |
| ADOBE® SYSTEMS - ADOBE® EXPERIENCE PLATFORM SDK - ADOBE® ANALYTICS MOBILE SERVICES EXTENSION - ANDROID® | | | RESEARCH: 1 |
| ADOBE® SYSTEMS - ADOBE® EXPERIENCE PLATFORM SDK - ADOBE® MEDIA ANALYTICS FOR AUDIO & VIDEO EXTENSION - iOS® | | | RESEARCH: 1 |
| ADOBE® SYSTEMS - ADOBE® EXPERIENCE PLATFORM SDK - ADOBE® MEDIA ANALYTICS FOR AUDIO & VIDEO EXTENSION - ANDROID® | | | RESEARCH: 1 |
| OPEN@ADOBE® - CAIRNGORM | | | NOT APPROVED: 1 |
| OPEN@ADOBE® FLEXUNIT | | | EOL: 1 |
| DATALOGICS ADOBE® PDF LIBRARY | | | MAINTAIN: 1 |
| EMC xPRESSO FOR ADOBE® INDESIGN CS | | | DIVEST: 1 PROHIBITED: 2 |
| FILE OPEN SYSTEMS ADOBE® FILE OPEN PLUGIN | | | RETIRED: 1 |
| GMC INSPIRE PLUGIN MAC ADOBE® INDESIGN | | | DIVEST: 1 |
| EVERMAP AUTOSPLIT PLUG-IN FOR ADOBE® ACROBAT | | | RETIRED: 3 |
| EVERMAP AUTOMAILMERGE PLUGIN FOR ADOBE® ACROBAT | | | RETIRED: 1 |

| | |
|---|---|
| ADEP INTERACTIVE STATEMENTS SOLUTION | RETIRED: 1 |
| ADLIB EXPRESS SERVER | RETIRED: 1 |
| AJAR PRODUCTIONS - IN5 | MAINTAIN: 1 |
| ALACRA® COMPLIANCE TOOLBAR | DIVEST: 1 |
| APACHE® JEMPBOX | DIVEST: 2 \| EOL: 8 |
| APACHE® SOFTWARE FOUNDATION - JACKRABBIT-SPI2DAV | NOT APPROVED: 1 |
| ASPOSE® ASPOSE®.TOTAL FOR JAVA® | DIVEST: 1 |
| ASPOSE® PDF FOR .NET | RETIRED: 1 |

*FIG. 6 CONT.1*

| COMPONENT NAME | EXACT MATCH? ☐ | ADOBE® | | ENTER | |
|---|---|---|---|---|---|
| | | LIFECYCLE COUNTS | | | |
| ADOBE® AIR | MAINTAIN: 1 | DIVEST: 2 | PROHIBITED: 4 | NO LIFECYCLE: 1 | |
| ADOBE® CQ5 | | | PROHIBITED: 1 | | |
| ADOBE® ARIA | | | RETIRED: 1 | | |
| ADOBE® DRIVE | | | RETIRED: 1 | | |
| ADOBE® FLASH | | | RETIRED: 2 | | |
| ADOBE® INCOPY | | | RETIRED: 1 | | |
| ADOBE® BLAZEDS | | | EOL: 7 | | |
| ADOBE® CONNECT | | | RETIRED: 1 | | |
| ADOBE® FLEXPMD | | | EOL: 1 | | |
| ADOBE® AUDITION | | | RETIRED: 1 | | |
| ADOBE® FLEX SDK | MAINTAIN: 1 | DIVEST: 1 | EOL: 6 | NO LIFECYCLE: 2 | |
| ADOBE® FREEHAND | | | RETIRED: 3 | | |
| ADOBE® HOMESITE | | | RETIRED: 1 | | |
| ADOBE® INDESIGN | | | RETIRED: 1 | | |
| ADOBE® ROBOHELP | INVEST: 1 | DIVEST: 1 | PROHIBITED: 1 | RETIRED: 1 | |
| ADOBE® SQUIGGLY | | | NOT APPROVED: 1 | | |
| ADOBE® CAPTIVATE | INVEST: 1 | MAINTAIN: 1 | DIVEST: 1 | NOT APPROVED: 2 | PROHIBITED: 3 | RETIRED: 5 |
| ADOBE® FIREWORKS | | | RETIRED: 5 | | |
| ADOBE® PHOTOSHOP | | | RETIRED: 2 | | |

| | FROM FIG 7 | | | | | |
|---|---|---|---|---|---|---|
| ADOBE® PRESENTER | | INVEST: 1 | | MAINTAIN: 1 | | PROHIBITED: 3 |
| ADOBE® ACROBAT DC | | | | INVEST: 1 | | |
| ADOBE® AUTHORWARE | | | | RETIRED: 1 | | |
| ADOBE® CONTRIBUTE | | NOT APPROVED: 1 | | | RETIRED: 2 | |
| ADOBE® FONT FOLIO | | | | PROHIBITED: 1 | | |
| ADOBE® FRAMEMAKER | | INVEST: 1 | MAINTAIN: 1 | DIVEST: 1 | PROHIBITED: 2 | RETIRED: 3 |
| ADOBE® PHOTOSUITE | | | | RETIRED: 1 | | |

*FIG. 7 CONT.1*

METHOD AND SYSTEM FOR PERFORMING SEARCH WITH SPECIALIZED SORT

CROSS-REFERENCE TO RELATED APPLICATIONS

This application claims the benefit of U.S. Provisional Patent Application Ser. No. 62/892,194, filed Aug. 27, 2019, which is hereby incorporated by reference in its entirety.

BACKGROUND

1. Field of the Disclosure

This technology generally relates to methods and systems for performing a search, and more particularly to methods and systems for performing an Internet search with a specialized sort in order to improve a quality of a search result.

2. Background Information

The Internet serves as a vast repository of information that is generally accessible to users that have electronic devices that are network compatible, such as personal computers and smart phones. As a result of the sheer volume of information that is available on the Internet, users typically perform searches by using conventional search engines, such as, for example, Google.

When a user uses a conventional search engine to perform a search, the user typically provides one or more search terms as an input to the search engine, and the search engine then provides an ordered list of results that is based on the search terms. The order in which the results are presented is based on a relevancy ranking that is determined by the search algorithm employed by the search engine.

In many instances, the number of results is very large, i.e., on the order of hundreds, thousands, or millions. As a result, a typical user may access only a relatively low number of the results, because reviewing a large number of results is impractical and overly time-consuming. Therefore, as a practical matter, the order of the results effectively acts as a filter, such that only a few results are actually accessed, and most results are never accessed.

Accordingly, there is a need to ensure that the rank ordering of results corresponds to a quality of the search results, i.e., a likelihood that each particular result matches with the information that is actually sought by the user.

SUMMARY

The present disclosure, through one or more of its various aspects, embodiments, and/or specific features or sub-components, provides, inter alia, various systems, servers, devices, methods, media, programs, and platforms for performing an Internet search with a specialized sort in order to improve a quality of a search result.

According to an aspect of the present disclosure, a method for performing a search with a specialized sort is provided. The method is implemented by at least one processor. The method includes: receiving, by the at least one processor, a textual input that includes at least one search term; using, by the at least one processor, the at least one search term to identify a plurality of Internet-accessible information items that relate to the at least one search term; assigning, by the at least one processor, a respective relevance score to each item of the identified plurality of Internet-accessible information items, each respective relevance score being based on a degree of closeness of a textual match between the corresponding information item and the at least one search term; and outputting, by the at least one processor, an ordered list of the plurality of Internet-accessible information items, wherein an order of the items within the list is determined based on the assigned relevance scores.

The identified plurality of Internet-accessible information items may include a first group for which a respective title that relates to the corresponding information item exactly textually matches with the at least one search term, such that the respective relevance score for each item included in the first group is higher than the respective relevance score for each item that is not included in the first group.

The identified plurality of Internet-accessible items may further include a second group for which the respective title that relates to the corresponding information item starts with an exact textual match with the at least one search term and also includes additional text, such that the respective relevance score for each item included in the second group is higher than the respective relevance score for each item that is not included in either of the first group and the second group.

For each item included in the second group, the respective relevance score may be determined based on a number of characters of the additional text included in the respective title, such that when the number of characters is lower, the respective relevance score is higher.

The identified plurality of Internet-accessible items may further include a third group for which the respective title that relates to the corresponding information item starts with text that does not exactly match with the at least one search term and also includes an exact textual match with the at least one search term, such that the respective relevance score for each item included in the third group is higher than the respective relevance score for each item that is not included in any of the first group, the second group, and the third group.

For each item included in the third group, the respective relevance score may be determined based on a position of the exact textual match within the respective title, such that when the position is closer to the start of the respective title, the respective relevance score is higher.

For each item included in the third group for which the position of the exact textual match within the respective title is equally close to the start of the respective title, the respective relevance score may be further determined based on a number of characters of the additional text included in the respective title, such that when the number of characters is lower, the respective relevance score is higher.

The identified plurality of Internet-accessible items may further include a fourth group for which the respective title that relates to the corresponding information item does not include an exact textual match with the at least one search term, and for which at least one of a respective description and a related item includes at least a partial textual match with the at least one search term, such that the respective relevance score for each item included in the fourth group is higher than the respective relevance score for each item that is not included in any of the first group, the second group, the third group, and the fourth group.

The method may further include converting, by the at least one processor, respective text of each item of the plurality of Internet-accessible information items to lower-case text. The assigning of the respective relevance score may be performed based on the converted text.

According to another aspect of the present disclosure, a computing apparatus for performing a search is provided.

The computing apparatus includes a processor, a memory, and a communication interface coupled to each of the processor and the memory. The processor is configured to: receive, via the communication interface, a textual input that includes at least one search term; use the at least one search term to identify a plurality of Internet-accessible information items that relate to the at least one search term; assign a respective relevance score to each item of the identified plurality of Internet-accessible information items, each respective relevance score being based on a degree of closeness of a textual match between the corresponding information item and the at least one search term; and output, via the communication interface, an ordered list of the plurality of Internet-accessible information items, wherein an order of the items within the list is determined based on the assigned relevance scores.

The identified plurality of Internet-accessible information items may include a first group for which a respective title that relates to the corresponding information item exactly textually matches with the at least one search term, such that the respective relevance score for each item included in the first group is higher than the respective relevance score for each item that is not included in the first group.

The identified plurality of Internet-accessible items may further include a second group for which the respective title that relates to the corresponding information item starts with an exact textual match with the at least one search term and also includes additional text, such that the respective relevance score for each item included in the second group is higher than the respective relevance score for each item that is not included in either of the first group and the second group.

For each item included in the second group, the respective relevance score may be determined based on a number of characters of the additional text included in the respective title, such that when the number of characters is lower, the respective relevance score is higher.

The identified plurality of Internet-accessible items may further include a third group for which the respective title that relates to the corresponding information item starts with text that does not exactly match with the at least one search term and also includes an exact textual match with the at least one search term, such that the respective relevance score for each item included in the third group is higher than the respective relevance score for each item that is not included in any of the first group, the second group, and the third group.

For each item included in the third group, the respective relevance score may be determined based on a position of the exact textual match within the respective title, such that when the position is closer to the start of the respective title, the respective relevance score is higher.

For each item included in the third group for which the position of the exact textual match within the respective title is equally close to the start of the respective title, the respective relevance score may be further determined based on a number of characters of the additional text included in the respective title, such that when the number of characters is lower, the respective relevance score is higher.

The identified plurality of Internet-accessible items may further include a fourth group for which the respective title that relates to the corresponding information item does not include an exact textual match with the at least one search term, and for which at least one of a respective description and a related item includes at least a partial textual match with the at least one search term, such that the respective relevance score for each item included in the fourth group is higher than the respective relevance score for each item that is not included in any of the first group, the second group, the third group, and the fourth group.

The processor may be further configured to convert respective text of each item of the plurality of Internet-accessible information items to lowercase text, and to assign the respective relevance score to each item based on the converted text.

According to yet another aspect of the present disclosure, a non-transitory computer readable storage medium storing instructions for performing a search is provided. The storage medium includes executable code which, when executed by at least one processor, causes the at least one processor to: receive a textual input that includes at least one search term; use the at least one search term to identify a plurality of Internet-accessible information items that relate to the at least one search term; assign a respective relevance score to each item of the identified plurality of Internet-accessible information items, each respective relevance score being based on a degree of closeness of a textual match between the corresponding information item and the at least one search term; and output an ordered list of the plurality of Internet-accessible information items, wherein an order of the items within the list is determined based on the assigned relevance scores.

When executed by the at least one processor, the executable code may further cause the at least one processor to convert respective text of each item of the plurality of Internet-accessible information items to lowercase text, and to assign the respective relevance score to each item based on the converted text.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 6 and FIG. 7 are exemplary screen shots that illustrate search results obtained by performing the method of FIG. 4.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
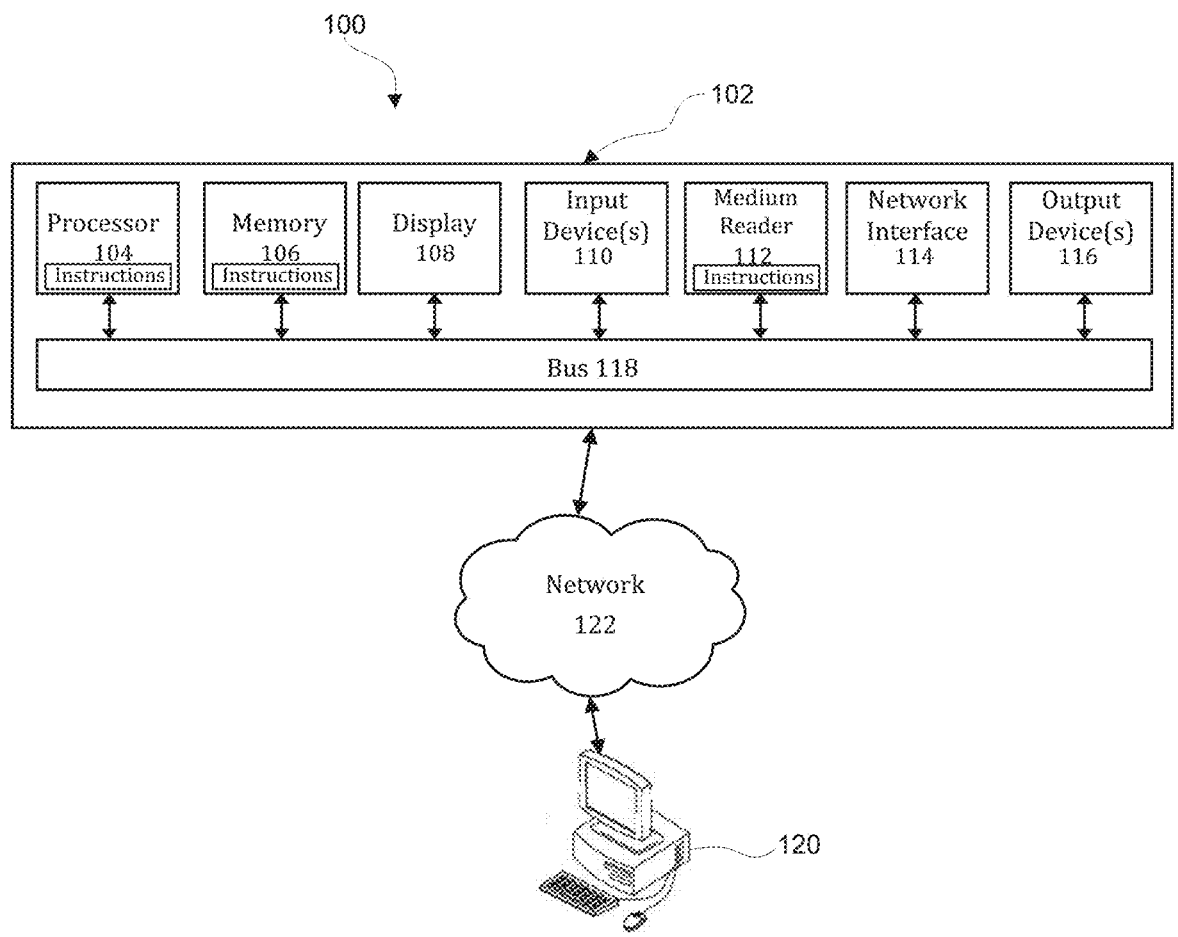
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized methods and systems for performing an Internet search with a specialized sort in order to improve a quality of a search result.

Figure 2:
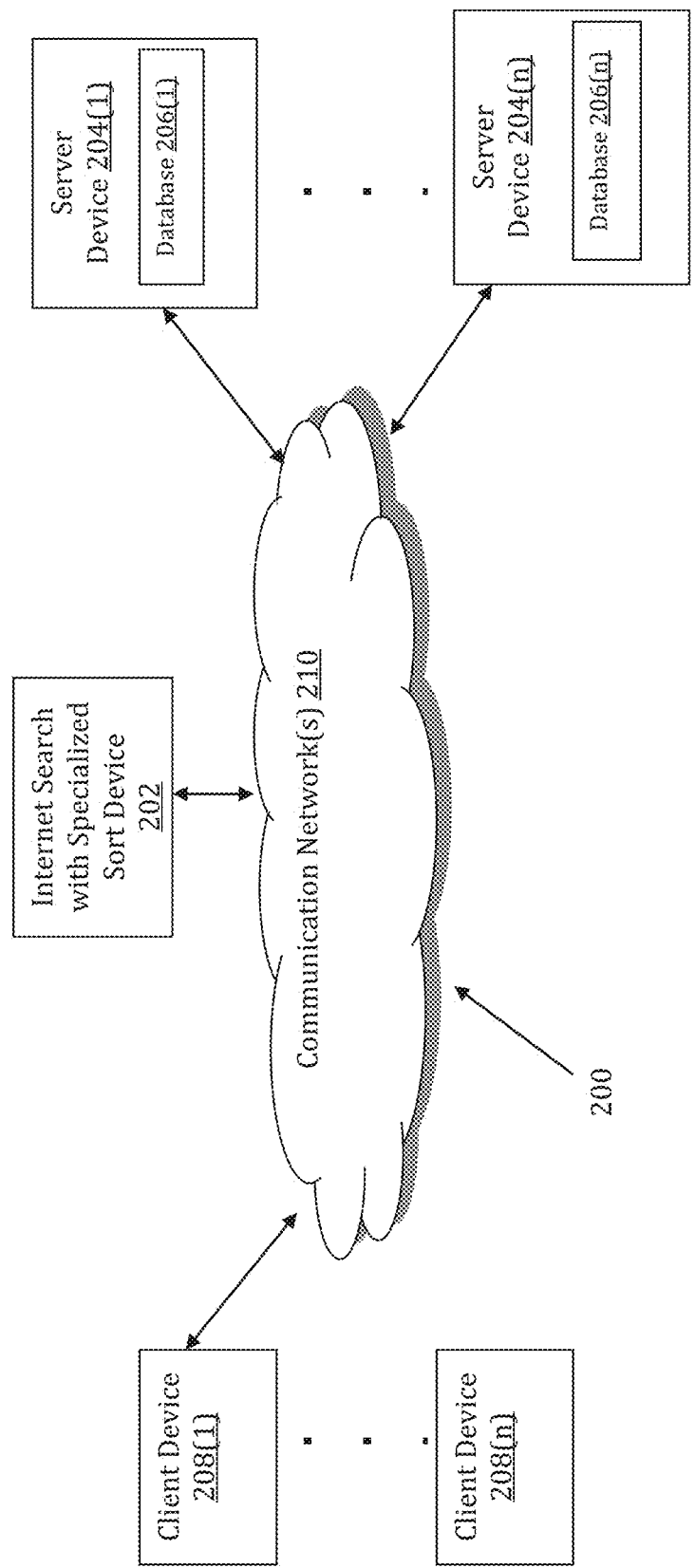
FIG. 2 illustrates an exemplary diagram of a network environment.

Referring to FIG. 2, a schematic of an exemplary network environment 200 for implementing a method for performing an Internet search with a specialized sort in order to improve a quality of a search result is illustrated. In an exemplary embodiment, the method is executable on any networked computer platform, such as, for example, a personal computer (PC).

The method for performing an Internet search with a specialized sort in order to improve a quality of a search result may be implemented by an Internet Search with Specialized Sort (ISSS) device 202. The ISSS device 202 may be the same or similar to the computer system 102 as described with respect to FIG. 1. The ISSS device 202 may store one or more applications that can include executable instructions that, when executed by the ISSS device 202, cause the ISSS device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ISSS device 202 itself, may be located in virtual server(s) running in a cloud-based computing environment rather than being tied to one or more specific physical network computing devices. Also, the application(s) may be running in one or more virtual machines (VMs) executing on the ISSS device 202. Additionally, in one or more embodiments of this technology, virtual machine(s) running on the ISSS device 202 may be managed or supervised by a hypervisor.

In the network environment 200 of FIG. 2, the ISSS device 202 is coupled to a plurality of server devices 204(1)-204(n) that hosts a plurality of databases 206(1)-206(n), and also to a plurality of client devices 208(1)-208(n) via communication network(s) 210. A communication interface of the ISSS device 202, such as the network interface 114 of the computer system 102 of FIG. 1, operatively couples and communicates between the ISSS device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ISSS device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and ISSS devices that efficiently implement a method for performing an Internet search with a specialized sort in order to improve a quality of a search result.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ISSS device 202 may be a standalone device or integrated with one or more other devices or apparatuses, such as one or more of the server devices 204(1)-204(n), for example. In one particular example, the ISSS device 202 may include or be hosted by one of the server devices 204(1)-204(n), and other arrangements are also possible. Moreover, one or more of the devices of the ISSS device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the ISSS device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store search algorithm data, historical search results data, and data that relates to performing an Internet search with a specialized sort function.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the ISSS device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the ISSS device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the ISSS device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ISSS device 202, the server devices 204(1)-204(n), or the client devices 208(1)-208(n), for example, may be configured to operate as virtual instances on the same physical machine. In other words, one or more of the ISSS device 202, the server devices 204(1)-204(n), or the client devices 208(1)-208(n) may operate on the same physical device rather than as separate devices communicating through communication network(s) 210. Additionally, there may be more or fewer ISSS devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
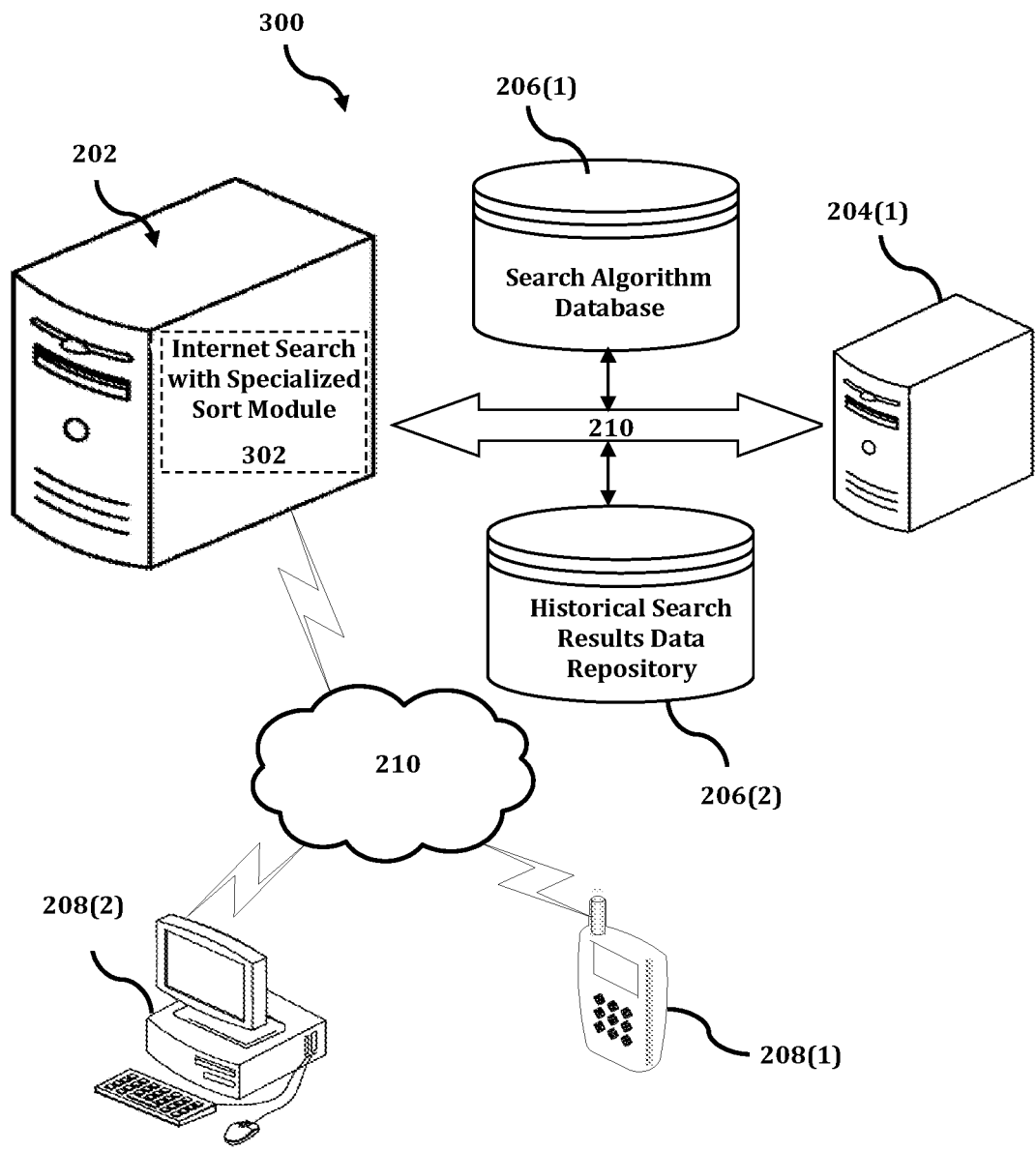
FIG. 3 shows an exemplary system for implementing a method for performing an Internet search with a specialized sort in order to improve a quality of a search result.

The ISSS device 202 is described and shown in FIG. 3 as including an Internet search with specialized sort module 302, although it may include other rules, policies, modules, databases, or applications, for example. As will be described below, the Internet search with specialized sort module 302 is configured to implement a method for performing an Internet search with a specialized sort in order to improve a quality of a search result.

An exemplary process 300 for implementing a mechanism for performing an Internet search with a specialized sort in order to improve a quality of a search result by utilizing the network environment of FIG. 2 is shown as being executed in FIG. 3. Specifically, a first client device 208(1) and a second client device 208(2) are illustrated as being in communication with ISSS device 202. In this regard, the first client device 208(1) and the second client device 208(2) may be "clients" of the ISSS device 202 and are described herein as such. Nevertheless, it is to be known and understood that the first client device 208(1) and/or the second client device 208(2) need not necessarily be "clients" of the ISSS device 202, or any entity described in association therewith herein. Any additional or alternative relationship may exist between either or both of the first client device 208(1) and the second client device 208(2) and the ISSS device 202, or no relationship may exist.

Further, ISSS device 202 is illustrated as being able to access a search algorithm database 206(1) and a historical search results data repository 206(2). The Internet search with specialized sort module 302 may be configured to access these databases for implementing a method for performing an Internet search with a specialized sort in order to improve a quality of a search result.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the ISSS device 202 via broadband or cellular communication. Of course, these embodiments are merely exemplary and are not limiting or exhaustive.

Upon being started, the Internet search with specialized sort module 302 executes a process for performing an Internet search with a specialized sort in order to improve a quality of a search result. An exemplary process for performing an Internet search with a specialized sort in order to improve a quality of a search result is generally indicated at flowchart 400 in FIG. 4.

Figure 4:
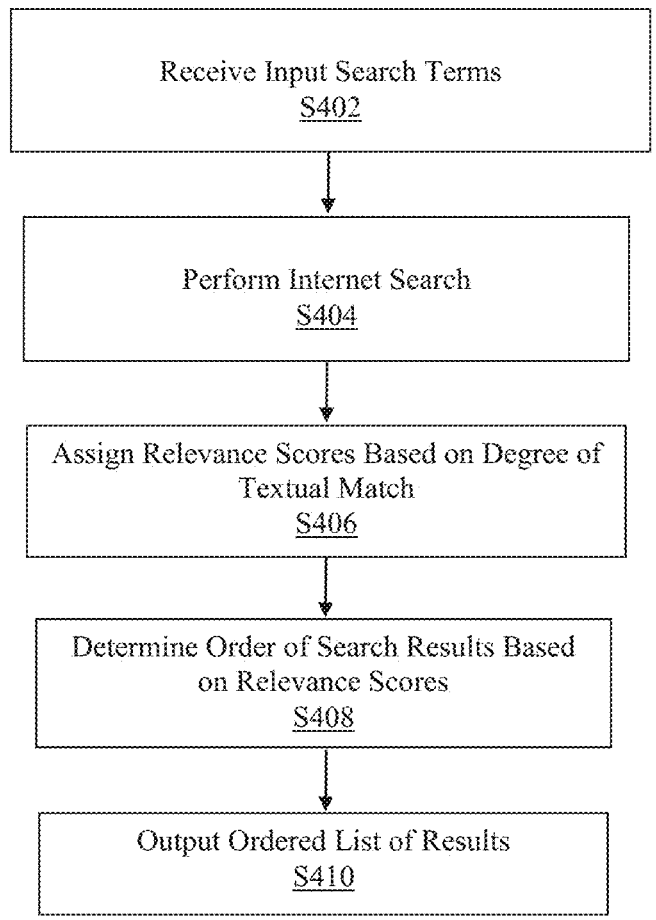
FIG. 4 is a flowchart of an exemplary process for implementing a method for performing an Internet search with a specialized sort in order to improve a quality of a search result.

In the process 400 of FIG. 4, at step S402, the Internet search with specialized sort module 302 receives one or more input search terms. In an exemplary embodiment, a graphical user interface (GUI) is provided on a display, such as, for example, a computer screen or a smart phone, and a user is prompted to enter a textual input that includes the input search terms.

At step S404, the Internet search with specialized sort module 302 performs an Internet search based on the input search terms. The result of the search includes a plurality of Internet-accessible information items that relate to the input search terms.

At step S406, the Internet search with specialized sort module assigns a respective relevance score for each information item included in the search results. In an exemplary embodiment, each respective relevance score correlates with a degree of closeness of a textual match between the corresponding information item and the search terms. For example, when there is an exact match between a title of a particular information item and an input search term or terms, a highest possible relevance score may be assigned; and when there is an exact match between the title of the item and the starting portion of the input search term(s), with additional text included in the title of the item, a lower relevance score that is still relatively high may be assigned. Further, when the title of the item starts with text that does not exactly match the input search term(s) but still includes an exact match with the input search term(s), a lower relevance score that is relatively average may be assigned; and when the title of the item does not include an exact match with the input search term(s), but a description of the item and/or a related item includes at least a partial textual match with the input search term(s), then a relatively low may be assigned.

At step S408, the Internet search with specialized sort module arranges the search results in an ordered list, the order of which is based on the relevance scores. Then, at step S410, the ordered list is outputted. In an exemplary embodiment, the outputting of the order list is performed by displaying a first page of the ordered list on a display of an electronic device, such as, for example, a computer screen or a smart phone, so that the user can easily see the items that have been determined as being most relevant based on the input search terms.

Figure 5:
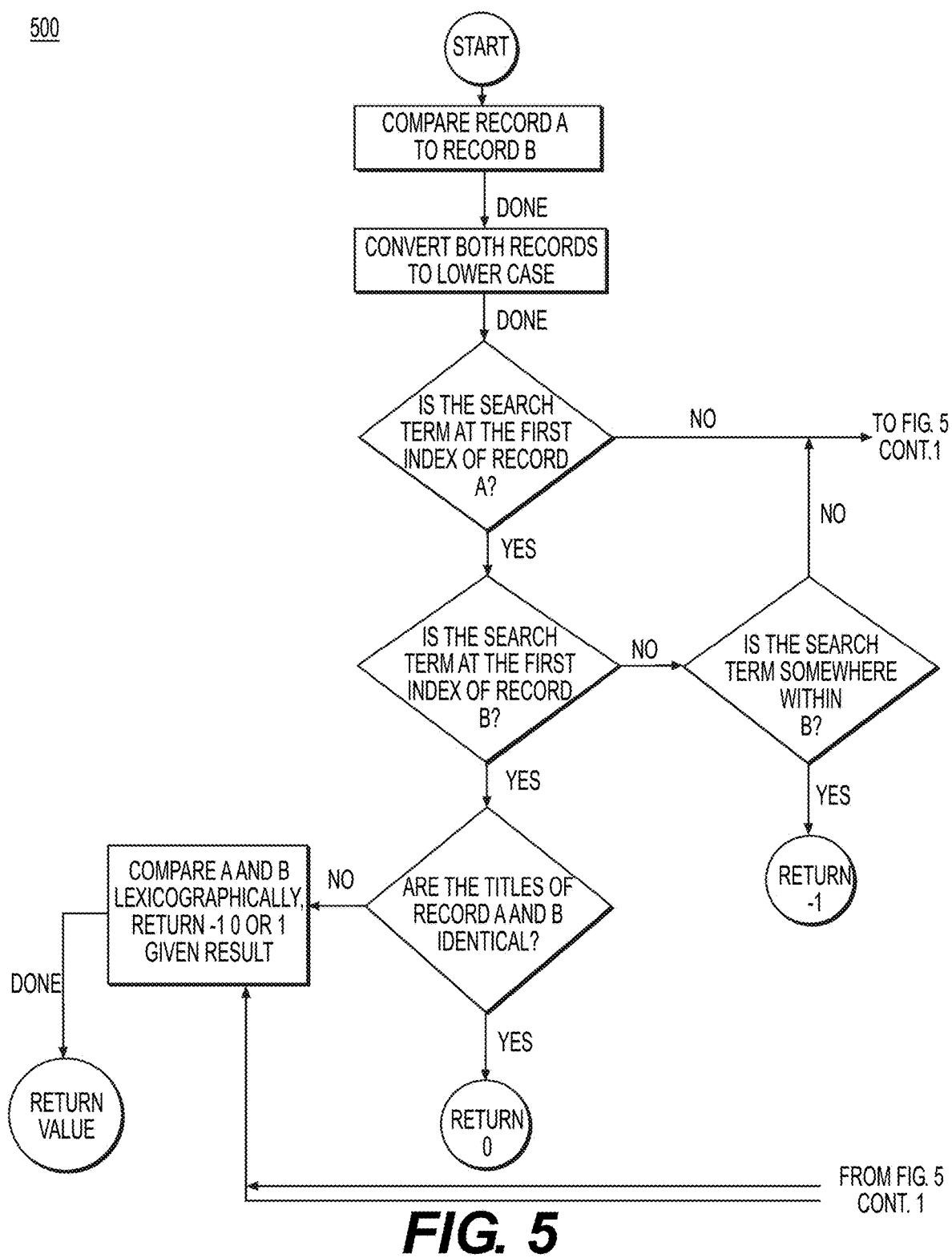
FIG. 5 is a flowchart of an exemplary process for applying an algorithm for determining a relevance score for a search result obtained by performing the method of FIG. 4.

FIG. 5 is a flowchart 500 of a process for applying an algorithm for determining a relative relevance score for a search result obtained by performing the method of FIG. 4, according to an exemplary embodiment. As illustrated in FIG. 5, when a search term input is received, two information items may be identified as potential search results, these are referred to herein as record A and record B, each of which has an index, a title, and a body. The algorithm first compares record A to record B and converts the text of both records to lower case for consistency and to remove the possibility that a record would be deemed as not matching due to a difference between upper-case text and lower-case text.

The algorithm then performs a sequence of yes/no inquiries that are intended to assess a degree of closeness of a textual match between the input search term and the index, tide, and body of each of record A and record B, in order to determine a relative relevance of record A with respect to record B, and vice versa. In this regard, when the algorithm determines that the search term textually matches more exactly with record A than with record B, then the result of the algorithm is a score of +1, thereby indicating that record A is deemed as being more relevant to the search than record B; when the algorithm determines that the search term textually matches more exactly with record B than with record A, then the result of the algorithm is a score of −1, thereby indicating that record B is deemed as being more relevant to the search than record A; and when the algorithm determines that the search term textually matches with both record A and record B equally, then the result of the algorithm is a score of zero (0), thereby indicating that record A and record B are deemed as being equally relevant to the search.

Referring to FIG. 6 and FIG. 7, exemplary screen shots 600 and 700 that illustrate search results obtained by performing the method of FIG. 4 are shown. In this example, the input search term is "ADOBE", and FIG. 6 shows a list 600 of information items that are rank-ordered by relevance as determined by the algorithm illustrated in FIG. 5. In particular, none of the items has a title that is an exact match with the search term "ADOBE," but each respective title of the first 12 items starts with the word "Adobe" and includes additional text appended thereto, and the ordering is based on the number of additional text characters that are included (i.e., less additional text corresponds to a higher relevance score). Each respective title of the next 8 items does not start with "Adobe" but does include "Adobe" therein, and the ordering is based on the relative position of the search term with respect to the start of the title, in addition to the number of additional text characters. Each respective title of the final 8 items does not include "Adobe" and the ordering is based on the presence of the term "Adobe" in the description of each item and/or in a related item.

FIG. 7 shows a list 700 of component names that are rank-ordered by relevance as determined by the algorithm illustrated in FIG. 5. In particular, none of the components has a name that is an exact match with the search term "ADOBE," but each respective name of all 26 components starts with the word "Adobe" and includes additional text appended thereto, and the ordering is based on the number of additional text characters that are included (i.e., less additional text corresponds to a higher relevance score).

Accordingly, with this technology, an optimized process for performing an Internet search with a specialized sort in order to improve a quality of a search result is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for performing a search, the method being implemented by at least one processor, the method comprising:
   receiving, by the at least one processor, a textual input that includes at least one search term;
   using, by the at least one processor, the at least one search term to identify a plurality of Internet-accessible information items that relate to the at least one search term, the plurality of Internet-accessible information items corresponding to at least one potential search result;
   generating, by the at least one processor, at least one record for each of the plurality of Internet-accessible information items, the at least one record corresponding to a structured data set that includes an index, a title, and a body;
   assessing, by the at least one processor for each of the at least one record, a degree of closeness of a textual match between the at least one record and the at least one search term by,
      performing, by the at least one processor, a sequence of yes or no inquires to determine the textual match between the at least one search term and the index, the title, and the body of each of the at least one record;
   assigning, by the at least one processor, a respective relevance score to each item of the identified plurality of Internet-accessible information items, each respective relevance score being based on the degree of closeness of the corresponding at least one record; and
   outputting, by the at least one processor, an ordered list of the plurality of Internet-accessible information items, wherein an order of the items within the list is determined based on the assigned relevance scores,
   wherein the identified plurality of Internet-accessible information items includes a first group for which a respective title that relates to the corresponding information item exactly textually matches with the at least one search term, such that the respective relevance score for each item included in the first group is higher than the respective relevance score for each item that is not included in the first group; and
   wherein the identified plurality of Internet-accessible information items further includes a second group for which the respective title that relates to the corresponding information item starts with an exact textual match with the at least one search term and also includes additional text, such that the respective relevance score for each item included in the second group is higher than the respective relevance score for each item that is not included in either of the first group and the second group.

2. The method of claim 1, wherein for each item included in the second group, the respective relevance score is determined based on a number of characters of the additional text included in the respective title, such that when the number of characters is lower, the respective relevance score is higher.

3. The method of claim 1, wherein the identified plurality of Internet-accessible items further includes a third group for which the respective title that relates to the corresponding information item starts with text that does not exactly match with the at least one search term and also includes an exact textual match with the at least one search term, such that the respective relevance score for each item included in the third group is higher than the respective relevance score for each item that is not included in any of the first group, the second group, and the third group.

4. The method of claim 3, wherein for each item included in the third group, the respective relevance score is determined based on a position of the exact textual match within the respective title, such that when the position is closer to the start of the respective title, the respective relevance score is higher.

5. The method of claim 4, wherein for each item included in the third group for which the position of the exact textual match within the respective title is equally close to the start of the respective title, the respective relevance score is further determined based on a number of characters of the additional text included in the respective title, such that when the number of characters is lower, the respective relevance score is higher.

6. The method of claim 3, wherein the identified plurality of Internet-accessible items further includes a fourth group for which the respective title that relates to the corresponding information item does not include an exact textual match with the at least one search term, and for which at least one of a respective description and a related item includes at least a partial textual match with the at least one search term, such that the respective relevance score for each item included in the fourth group is higher than the respective relevance score for each item that is not included in any of the first group, the second group, the third group, and the fourth group.

7. The method of claim 1, further comprising converting, by the at least one processor, respective text of each item of the plurality of Internet-accessible information items to lowercase text, wherein the assigning of the respective relevance score is performed based on the converted text.

8. A computing apparatus for performing a search, the computing apparatus comprising:
   a processor;
   a memory; and
   a communication interface coupled to each of the processor and the memory,
   wherein the processor is configured to:
      receive, via the communication interface, a textual input that includes at least one search term;
      use the at least one search term to identify a plurality of Internet-accessible information items that relate to the at least one search term, the plurality of Internet-accessible information items corresponding to at least one potential search result;
      generate at least one record for each of the plurality of Internet-accessible information items, the at least one record corresponding to a structured data set that includes an index, a title, and a body;
      assess, for each of the at least one record, a degree of closeness of a textual match between the at least one record and the at least one search term by causing the processor to:
         perform a sequence of yes or no inquires to determine the textual match between the at least one search term and the index, the title, and the body of each of the at least one record;
      assign a respective relevance score to each item of the identified plurality of Internet-accessible information items, each respective relevance score being based on the degree of closeness of the corresponding at least one record; and output, via the communication interface, an ordered list of the plurality of Internet-accessible information items, wherein an order of the items within the list is determined based on the assigned relevance scores, wherein the identified plurality of Internet-accessible information items includes a first group for which a respective title that relates to the corresponding information item exactly textually matches with the at least one search term, such that the respective relevance score for each item included in the first group is higher than the respective relevance score for each item that is not included in the first group; and wherein the identified plurality of Internet-accessible information items further includes a second group for which the respective title that relates to the corresponding information item starts with an exact textual match with the at least one search term and also includes additional text, such that the respective relevance score for each item included in the second group is higher than the respective relevance score for each item that is not included in either of the first group and the second group.

9. The computing apparatus of claim 8, wherein for each item included in the second group, the respective relevance score is determined based on a number of characters of the additional text included in the respective title, such that when the number of characters is lower, the respective relevance score is higher.

10. The computing apparatus of claim 8, wherein the identified plurality of Internet-accessible items further includes a third group for which the respective title that relates to the corresponding information item starts with text that does not exactly match with the at least one search term and also includes an exact textual match with the at least one search term, such that the respective relevance score for each item included in the third group is higher than the respective relevance score for each item that is not included in any of the first group, the second group, and the third group.

11. The computing apparatus of claim 10, wherein for each item included in the third group, the respective relevance score is determined based on a position of the exact textual match within the respective title, such that when the position is closer to the start of the respective title, the respective relevance score is higher.

12. The computing apparatus of claim 11, wherein for each item included in the third group for which the position of the exact textual match within the respective title is equally close to the start of the respective title, the respective relevance score is further determined based on a number of characters of the additional text included in the respective title, such that when the number of characters is lower, the respective relevance score is higher.

13. The computing apparatus of claim 10, wherein the identified plurality of Internet-accessible items further includes a fourth group for which the respective title that relates to the corresponding information item does not include an exact textual match with the at least one search term, and for which at least one of a respective description and a related item includes at least a partial textual match with the at least one search term, such that the respective relevance score for each item included in the fourth group is higher than the respective relevance score for each item that is not included in any of the first group, the second group, the third group, and the fourth group.

14. The computing apparatus of claim 8, wherein the processor is further configured to convert respective text of each item of the plurality of Internet-accessible information items to lowercase text, and to assign the respective relevance score to each item based on the converted text.

15. A non-transitory computer readable storage medium storing instructions for performing a search, the storage medium comprising executable code which, when executed by at least one processor, causes the at least one processor to:

receive a textual input that includes at least one search term;

use the at least one search term to identify a plurality of Internet-accessible information items that relate to the at least one search term, the plurality of Internet-accessible information items corresponding to at least one potential search result;

generate at least one record for each of the plurality of Internet-accessible information items, the at least one record corresponding to a structured data set that includes an index, a title, and a body;

assess, for each of the at least one record, a degree of closeness of a textual match between the at least one record and the at least one search term by causing the processor to:

perform a sequence of yes or no inquires to determine the textual match between the at least one search term and the index, the title, and the body of each of the at least one record;

assign a respective relevance score to each item of the identified plurality of Internet-accessible information items, each respective relevance score being based on the degree of closeness of the corresponding at least one record; and output an ordered list of the plurality of Internet-accessible information items, wherein an order of the items within the list is determined based on the assigned relevance scores, wherein the identified plurality of Internet-accessible information items includes a first group for which a respective title that relates to the corresponding information item exactly textually matches with the at least one search term, such that the respective relevance score for each item included in the first group is higher than the respective relevance score for each item that is not included in the first group; and wherein the identified plurality of Internet-accessible information items further includes a second group for which the respective title that relates to the corresponding information item starts with an exact textual match with the at least one search term and also includes additional text, such that the respective relevance score for each item included in the second group is higher than the respective relevance score for each item that is not included in either of the first group and the second group.

16. The storage medium of claim 15, wherein when executed by the at least one processor, the executable code further causes the at least one processor to convert respective text of each item of the plurality of Internet-accessible information items to lowercase text, and to assign the respective relevance score to each item based on the converted text.

* * * * *